United States Patent Office 3,306,256
Patented Feb. 28, 1967

3,306,256
METHOD AND MEDIUM FOR PRESERVING AND PACKAGING LIVE FISH
Sterling R. Lewis, Mount Vernon, Ohio, assignor to S & L Enterprises, Inc., Centerburg, Ohio, a corporation of Ohio
No Drawing. Filed Sept. 27, 1965, Ser. No. 490,732
5 Claims. (Cl. 119—3)

The present invention relates to an improved method and medium for preserving and packaging live fish. This invention is useful in sustaining or prolonging life in various species of aquatic animals while confined in comparatively small packages or containers. More specifically, the present invention is concerned with an improved method of preparing live fish for packaging and transportation and with an improved aqueous packaging medium capable of sustaining life in such fish for a prolonged period while confined in a package or container.

In the past, it has been proposed to package live fish, such as gold fish, minnows or the like, in relatively small sized, hermetically sealed containers or packages which are partially filled with water and a filtering material, and which are charged with gaseous oxygen (see U.S. Patent 2,652,807 issued September 22, 1953 to Washburn). Also, it has been proposed to increase the longevity of live fish in transit by confining the fish in an aqueous medium treated with or containing a bacteriostatic agent or composition which functions to inhibit bacterial growth in the aqueous medium and the fish (see U.S. Patent No. 3,110,285 issued November 12, 1963, to Greenough).

However, while these prior methods may tend to prolong the life of fish in transit to some measurable degree, from a practical standpoint, they do not provide an efficient, commercially acceptable means for insuring the maintenance of life in live fish which are packaged for storage and transit for comparatively long periods of time upwards of one to two weeks duration.

While the presence of adequate oxygen in a live fish-containing aqueous medium is one of the essential factors necessary to maintain life in the fish, there are other factors of equal importance. First, as recognized in the aforesaid Greenough Patent No. 3,110,285, it is necessary to control bacterial growth in the aqueous medium, otherwise the fish will be fatally contaminated and/or attacked by the build up in bacteria within a relatively short period of time. Secondly, and of equal importance, it is necessary that the fish be supplied with sufficient food to sustain life during the desired period of storage and transit in a confined and comparatively small volume of the aqueous medium.

Accordingly, it is the primary object of the present invention to provide an efficient and commercially practicable method for preserving and packaging live fish for storage and transit over prolonged periods of time upwards of one week or more duration.

It is another object of this invention to provide an improved aqueous medium in which live fish may be packaged and sustained for storage and shipment over prolonged periods of time in relatively small volume packages or containers.

A further object of this invention is to provide an efficient method by which live aquatic animals (including fish and crustacea, such as crayfish) may be packaged, stored and transported in relatively small volume containers or packages to be ultimately sold and/or used in live condition at locations comparatively remote from the site of packaging.

In accordance with the present invention, live fish, such as minnows or crayfish intended to be used as live fishing bait, or other larger species of table fish, such as catfish, bass, trout, perch, etc., may be packaged in relatively small volume containers for transportation to and storage at relatively remote points of sale and maintained in a live and healthy condition for periods of time upwards of a week's duration.

In the practice of the present invention, live fish, such as, for example, minnows, are taken from their natural or artificial habitats, such as a lake, pond, stream or reservoir, and placed and retained in a bacteria-reducing and inhibiting bath for a time sufficient to reduce the bacteria count of the fish from an average of say 35,000 per cc. to less than 5,000 per cc. and preferably below 3,000 per cc. The bacteria-reducing bath generally comprises a relatively large volume tank or vat containing an aqueous solution of a water soluble, antibiotic or bacteriostatic agent. The time of treatment of the fish in the bacteria-reducing bath will usually vary between 24 and 48 hours, depending upon the average bacterial count of the influent fish and the concentration of bacteriostatic agent in the bath.

Following bacterial reduction, the fish are then transferred to a relatively large volume, "forced feeding" bath comprising an aqueous solution containing a sugar, such as dextrose, sucrose, levulose, or maltose. The fish are permitted to remain in the "forced feeding" solution for from 24 to 48 hours during which time the fish are involuntarily fed by the natural ingestion of sugar from the sugar-containing solution. In the "forced feeding" tank, a percentage of the sugar which is dissolved in the water is ingested by the fish during circulation or "breathing" of the sugar solution through the gills of the fish in a manner similar to the ingestion of oxygen contained in the water. Following the "forced feeding" of the fish, they are then ready for packaging. The fish are transferred, either individually or in selected numbers, from the "forced feeding" bath to suitable, relatively small size packaging containers or receptacles, each of which contains approximately 50% by volume of an aqueous solution containing 0.1% by weight of metheneamine mandelate, or an equivalent bacteriostatic agent, and 1% by weight of dextrose, or an equivalent sugar.

In the case of live minnows to be sold as live fish bait, the packaging containers may comprise a generally squat cylindrical, waterproof, paperboard or plastic carton or cup body, similar to that used in packaging of various comestibles, and provided with a watertight, but air-vented, removable lid which is preferably transparent, and through which the fish may be viewed. Preferably, the live fish and aqueous solution occupy approximately 50% by volume of the packaging container and the remaining space of the container is occupied by atmosperic air under ordinary atmospheric pressures. Alternatively, the fish and packaging solution may be packaged in flexible, transparent sheet plastic bags or sacks whose initially open ends are heat sealed after filling with the fish, packaging solution and approximately 50% by volume of oxygen. However, the more rigid paperboard or plastic carton is preferred as a packaging container, as it affords greater protection against bruising or crushing of the fish during subsequent transportation and storage. Immediately following the packaging of the fish, the packages are refrigerated or otherwise cooled so as to maintain the fish at a temperature between 32° and 50° F. during subsequent transportation and storage and until the packaged fish are sold or otherwise used.

The antibiotic or bacteriostatic agents usable in the initial, bacterial reduction bath may comprise one or more of the commercially available antibiotics, such as metheneamine mandelate, sodium colistimethate, nitrofurantoin (5-nitro, 2-furfurylidene, 1-aminohydrantoin) and sodium cephalothin. The particular antibiotic or bacteriostatic agent or agents to be used in the pre-conditioning or bacterial reduction bath is determined by the particular predominant strain or strains of bacteria carried by the influent fish. As is well understood, one type of antibiotic or bacteriostatic agent may be more effective in attacking a certain specie of bacteria, while another type of antibiotic may be used to inhibit bacterial growth of a different strain. However, it has been found through replicate tests and experiments that metheneamine mandelate, in concentrations of from 0.05% to 3%, and most preferably 0.2%, by weight of the aqueous solution provides a particularly effective antibiotic and bacterial inhibitor against most strains of bacteria normally associated with fish and normally encountered in feces and waste matter excreted by fish.

The concentration of antibiotic or bacteriostatic agent used in the pretreating bath may vary rather widely between 0.05% and 3% by weight of the aqueous solution, depending upon the quantum (bacterial count) and strain of bacteria carried by the influent fish, as well as the time during which the fish are retained in the pre-treating bath, and also the temperature of the pretreating bath. However, it has been found that an aqueous solution containing approximately 0.2% by weight of the selected bacteriostatic agent or agents and maintained at a temperature between 45° and 74° F. will effectively reduce the average bacteria count of a normal healthy fish from approximately 35,000 per cc. to less than 5,000 per cc. in from 24 to 48 hours. A 0.1% aqueous solution of the same bacteriostatic agent or agents requires a holding time of from 6 to 7 days to reduce the bacteria count of the fish from the normal average of 35,000 per cc. to the desired level of 5,000 per cc. Also, while it is possible to reduce the concentration of bacteriostatic agents in the pre-treating, bacterial reduction bath to as low as 0.05% by weight of the solution, the time and temperature of treatment or holding of the fish in the bath must be proportionately increased to attain the desired reduction of bacteria count. It has also been found that concentrations up to 3% by weight of the bacteriostatic agent may be used in the pre-treating bath without harmful results to the fish. However, the time required to reduce the bacteria count to below 5,000 per cc. is not materially reduced by using a 3% solution of bacteriostatic agent as compared to a 0.2% solution. Pre-treating solutions containing over 3% by weight of bacteriostatic agents should be avoided as these more concentrated solutions cause internal bleeding and consequent damage to the fish. The temperature of the bacterial reduction bath may range from 45° to 74° F., but preferably is maintained between 58° and 61° F.

The "forced feeding" bath, as previously indicated, comprises an aqueous solution containing sugar, such as dextrose, sucrose, levulose, or maltose, in concentrations ranging from 0.05% to 3% by weight of the aqueous solution. Most preferably, the concentration of sugar in the "forced feeding" bath is maintained between 1% and 2% by weight of the solution, and the temperature of the bath is preferably maintained between 50° and 60° F. To prevent an undesired buildup of bacteria in the "forced feeding" bath, it is preferable to maintain a concentration of approximately 0.1% by weight of a bacteriostatic agent, such as metheneamine mandelate, in the "forced feeding" solution. Ordinarily, a holding time of from 24 to 48 hours in a "forced feeding" bath containing 2% by weight of sugar is sufficient to cause an average weight increase in the fish of approximately 3% to 4%.

Thus, by successively introducing and holding the fish in both the bacterial reduction and "forced feeding" baths for an aggregate period of time of from 2 to 4 days, the fish is adequately preconditioned or prepared for packaging by reducing its bacteria count to an abnormally low level and by "fattening" it sufficiently to help it sustain life during its period of confinement in the package or carton.

The aqueous packaging solution contains sufficient bacteriostatic agent to retard and prevent excessive bacterial growth in the package during the average period of confinement of the fish therein, say, for example, one week. At the same time, the sugar present in the packaging solution provides sufficient food to sustain the fish during the average period of confinement in the package. The air which normally occupies the upper 50% of the internal volume of the packaging container provides sufficient oxygen to sustain the fish during the average period of confinement in the package at the desired temperature of from 32° to 50° F.

To determine the effectiveness of the bacteria-reducing and "forced feeding" baths in prolonging fish life under conditions of confinement in relatively small volume containers, a number of comparative experiments were undertaken. In one such experiment, a batch of live and healthy Lake Erie, Emerald Shiner minnows (*Notropis atherionoides*) having an average bacteria count of 35,000 per cc. were divided into two comparative groups consisting of twelve minnows each, with each group having an aggregate weight of 12.0 grams. One group of twelve minnows was used as a control sample and was placed in 250 cc. of tap water contained in an open top beaker and maintained at an average room temperature of approximately 70° F. The second test group of twelve minnows was placed in 250 cc. of a 0.1% by weight aqueous solution of metheneamine mandelate also contained in an open top beaker, and maintained at a temperature of approximately 45° F. for a period of seven days. After seven days, the twelve minnows making up the test group and contained in the 0.1% metheneamine mandelate solution were all alive and healthy and had a total aggregate weight of 11.0 grams. A sample of the seven day old test solution was tested and showed a bacteria count of approximately 3,500 per cc. The twelve minnows of the test group were then transferred from the 0.1% metheneamine mandelate solution and placed in 250 cc. of a sugar solution contained in an open top beaker. The sugar solution was composed of tap water and 2% by weight of dextrose and was maintained at a temperature of 45° F. The twelve minnows making up the test group were held in the 2% dextrose solution for 48 hours at 45° F. After 48 hours in the sugar solution, the twelve minnows were weighed and showed an aggregate weight gain of 0.4 gram since entering the sugar solution. This represented a weight increase of approximately 3.6% over the weight of the fish upon entering the sugar solution. The sugar solution was tested after the 48 hours immersion of the minnows therein and showed an average bacteria count of 26,000 per cc. The twelve minnows of the test group were then transferred from the 2% sugar solution to a twelve fluid ounce foamed plastic carton containing 250 cc. of an aqueous solution made up of 0.1% by weight of metheneamine mandelate, 1% by weight of dextrose and the remainder tap water. The plastic carton was then closed with a lid having a small air vent or opening formed therein. The carton and its contents were then placed in a refrigerator and maintained at approximately 45° F. After seven days in the carton all twelve minnows remained alive and had a total aggregate weight of 11.3 grams. A sample of the seven day old solution in the carton was tested and showed an average bacteria count of only 6,000 per cc. After fourteen days in the carton all twelve fish remained alive and had a total aggregate weight of 11.3 grams.

The bacteria count of the solution in the carton after fourteen days had risen to approximately 18,000 per cc. After twenty-one days in the carton, ten of the original twelve minnows were still alive and had a total aggregate weight of 11.2 grams. The carton solution, after twenty-one days, was tested and showed an average bacterial count of 49,000 per cc.

In contrast to this, of the original twelve minnows making up the control sample and contained in 250 cc. of untreated tap water at 70° F., seven were dead within seven days and all twelve were dead within fourteen days.

As another specific example of the practice of the present invention, approximately 200 Silver Shiner minnows (*Notropis photodonis*), originally taken from a northern Minnesota lake, were placed in an aquarium tank containing approximately three gallons of a bacteriostatic solution consisting of lake water and 0.2% by weight of metheneamine mandelate. The aquarium tank was equipped with an electrically operated recirculating pump and filter unit arranged to continuously circulate the solution between the aquarium tank and a refrigerated heat exchanger coil, so as to maintain the solution at a temperature of approximately 60° F. Just prior to the introduction of the minnows into the bacteriostatic solution, a bacteria test was made of the water in which the minnows were transported and from which test it was determined that the influent minnows were carrying an average bacteria count of 35,000 per cc. The minnows were retained in the 0.2% bacteriostatic solution of metheneamine mandelate for a period of 48 hours at a solution temperature of approximately 60° F. After 48 hours, a bacteria count was run on a sample of bacteriostatic solution containing the fish and revealed an average bacteria count of less than 3,000 per cc. At the end of 48 hours in the bacteriostatic solution, the minnows were removed therefrom and placed in a second aquarium tank containing three gallons of a "forced feeding" solution consisting essentially of lake water containing 2% by weight of dextrose and 0.1% by weight of metheneamine mandelate. The second or "forced feeding" tank was also equipped with a recirculating pump and filter unit and a refrigerated heat exchanger coil, and the temperature of the "forced feeding" bath was controlled at approximately 56° F. The minnows were retained in the "forced feeding," sugar solution for 48 hours at a temperature of approximately 55° F.

After 48 hours in the "forced feeding" solution, the minnows were then transferred in groups of twelve to individual packaging cartons. Each group of twelve minnows was placed in a 12 counce, squat cylindrical carton composed of a foamed polystyrene plastic, and containing approximately 250 cc. of a packaging solution composed of 0.1% by weight of metheneamine mandelate, 1% by weight of dextrose and the remainder unchlorinated tap water. After placing the packaging solution and twelve minnows therein, each of the cartons were closed with a "snap-on" closure lid formed from a clear transparent polyethylene plastic. Each closure lid was formed with a small air vent opening to permit circulation of atmospheric air to and from the interior of the carton. The closed cartons with their contents were then placed for storage in a household, electrical refrigerator and maintained at a temperature of approximately 40° F. After seven days in the refrigerator, all of the packaged minnows were alive and appeared active and healthy. Bacteria counts were made on samples of solutions taken from several of the packaging cartons after seven days and revealed of an average bacteria count of 6,000 per cc. After fourteen days in the refrigerated packages, all minnows were still alive and appeared healthy. Samples of the packaging solutions after fourteen days were tested and revealed an average bacteria count of 18,000 per cc. After twenty-one days in the refrigerated packaging solution an average of two minnows in each carton or package was dead, and samples taken from the twenty-one day old packaging solution revealed an average bacteria count of 49,000 per cc., considerably in excess of the normal average bacteria count of 35,000 per cc. for the influent, untreated minnows. The packaging cartons were then removed from the refrigerator and discarded.

Many other laboratory and actual commercial packaging runs have been made, using the method and packaging medium of the present invention, from which it has been determined that various different species of minnows, table fish and crayfish may be efficiently packaged for storage and shipment and may be maintained in a live and healthy condition for periods up to three weeks duration.

Thus it will be seen that the present invention provides an improved method of preserving and packaging live fish by preconditioning the fish to reduce its normal bacteria count, and "force feeding" the fish prior to its introduction into a packaging container, and finally by packaging the fish in an aqueous solution which contains sufficient bacteriostatic agent and sugar therein to control bacterial growth and to supply the fish with enough food to maintain life during the expected period of confinement in the package.

Having thus described this invention, what is claimed is:

1. The method of preserving and packaging a live fish which comprises:
    (a) placing a live fish in an aqueous solution containing from 0.05% to 3% by weight of an antibiotic and retaining said fish therein until the average bacteria count of the solution is below 5,000 per cc.; then
    (b) placing said fish in a sugar-containing aqueous solution and causing the fish to remain therein for at least 24 hours; then
    (c) placing said fish in a packaging container containing approximately 50% by volume of an aqueous solution containing a bacteriostatic agent and a sugar.

2. The method of preserving a live fish which comprises:
    (a) placing a live fish in an aqueous solution containing from 0.05% to 3% by weight of an antibiotic selected from the class consisting of metheneamine mandelate, sodium colistimethate, nitrofurantoin and sodium caphalothin and retaining the fish in said solution for at least 24 hours; then
    (b) transferring said fish to a second aqueous solution containing from 0.05% to 3% by weight of a sugar selected from the class consisting of sucrose, levulose, maltose, and dextrose and retaining said fish therein for a period of from 24 to 48 hours; then
    (c) packaging said fish in an aqueous solution containing approximately 0.1% by weight of metheneamine mandelate and 1% by weight of dextrose and maintaining said last-named solution at a temperature between 32° and 50° F. until removal of said fish therefrom.

3. The method of preserving a live fish which comprises:
    (a) placing a live fish in an aqueous solution containing not more than 3% by weight of a water soluble bacteriostatic agent and causing the fish to remain in said solution until the bacteria count of the fish is less than 5,000 per cc.; then
    (b) placing said fish in an aqueous, sugar-containing solution for at least 24 hours; and then
    (c) placing said fish in a packaging container partially filled with an aqueous solution containing minor percentages of a bacteriostatic agent and a sugar.

4. The method of preconditioning and packaging a live fish which comprises:
   (a) placing a live fish in an aqueous solution containing at least 0.05%, and not more than 3% by weight of an antibiotic and permitting the fish to remain in said solution for at least 24 hours; then
   (b) transferring said fish to an aqueous solution containing at least 0.05%, and not more than 3% by weight of sugar and causing the fish to remain therein for at least 24 hours; and then
   (c) placing said fish in a confined, aqueous packaging solution containing minor percentages of an antibiotic and a sugar and maintaining said packaging solution in an oxygen-containing atmosphere and at a temperature between 32° and 50 F. until removal of the fish therefrom.

5. A liquid packaging medium for live fish comprising an aqueous solution containing from 0.05% to 3% by weight of an antibiotic, and from 0.05% to 3% by weight of a sugar.

References Cited by the Examiner

UNITED STATES PATENTS

| | | | |
|---|---|---|---|
| 1,795,238 | 3/1931 | Spence | 99—3 |
| 1,843,563 | 2/1932 | Knoernschild | 43—56 |
| 2,001,989 | 5/1935 | Theuerkauf | 119—5 |
| 2,652,807 | 9/1953 | Washburn | 119—3 |
| 2,963,400 | 12/1960 | Ross | 167—53 |
| 3,098,004 | 7/1963 | Haus et al. | 167—46 |
| 3,110,285 | 11/1963 | Greenough | 119—3 |

SAMUEL KOREN, *Primary Examiner.*

ALDRICH F. MEDBERY, *Examiner.*